US011470339B2

(12) United States Patent
Guo et al.

(10) Patent No.: US 11,470,339 B2
(45) Date of Patent: Oct. 11, 2022

(54) RESIDUAL PREDICTION FOR INTRA BLOCK COPYING

(71) Applicant: QUALCOMM Incorporated, San Diego, CA (US)

(72) Inventors: Liwei Guo, San Diego, CA (US); Chao Pang, San Diego, CA (US); Rajan Laxman Joshi, San Diego, CA (US); Joel Sole Rojals, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1208 days.

(21) Appl. No.: 14/469,477

(22) Filed: Aug. 26, 2014

(65) Prior Publication Data

US 2015/0063454 A1   Mar. 5, 2015

Related U.S. Application Data

(60) Provisional application No. 61/870,654, filed on Aug. 28, 2013, provisional application No. 61/870,654, filed on Aug. 27, 2013.

(51) Int. Cl.
| | |
|---|---|
| *H04N 19/176* | (2014.01) |
| *H04N 19/593* | (2014.01) |
| *H04N 19/70* | (2014.01) |
| *H04N 19/50* | (2014.01) |

(52) U.S. Cl.
CPC .......... *H04N 19/50* (2014.11); *H04N 19/176* (2014.11); *H04N 19/593* (2014.11); *H04N 19/70* (2014.11)

(58) Field of Classification Search
CPC .... H04N 19/176; H04N 19/50; H04N 19/593; H04N 19/70
USPC ..................................... 375/240.12
See application file for complete search history.

(56) References Cited

U.S. PATENT DOCUMENTS

| | | | |
|---|---|---|---|
| 9,503,726 B2 | 11/2016 | Oh et al. | |
| 2007/0065026 A1* | 3/2007 | Lee ...................... | H04N 19/176 382/236 |
| 2008/0310503 A1* | 12/2008 | Lee ........................ | H04N 19/91 375/240.2 |
| 2014/0286413 A1 | 9/2014 | Joshi et al. | |
| 2014/0294089 A1 | 10/2014 | Macinnis et al. | |

(Continued)

FOREIGN PATENT DOCUMENTS

| | | |
|---|---|---|
| CN | 103096067 A | 5/2013 |
| WO | 9602895 A1 | 2/1996 |
| WO | 2006007279 A2 | 1/2006 |

OTHER PUBLICATIONS

Flynn, "High Efficiency Video Coding (HEVC) Range Extensions text specification: Draft 4", Apr. 18, 2013 (Year: 2013).*

(Continued)

*Primary Examiner* — Albert Kir
(74) *Attorney, Agent, or Firm* — Shumaker & Sieffert, P.A.

(57) ABSTRACT

In an example, a method of decoding video data includes generating a residual block of a picture based on a predicted residual block including reconstructing one or more residual values of the residual block based on one or more predicted residual values of the residual block. The method also includes generating a current block of the picture based on a combination of the residual block and a prediction block of the picture.

36 Claims, 7 Drawing Sheets

(56) References Cited

U.S. PATENT DOCUMENTS

| | | | |
|---|---|---|---|
| 2015/0049813 A1* | 2/2015 | Tabatabai | H04N 19/513 375/240.16 |
| 2015/0264376 A1 | 9/2015 | Zou et al. | |
| 2016/0080748 A1* | 3/2016 | Sasai | H04N 19/46 375/240.12 |
| 2020/0404274 A1* | 12/2020 | Karczewicz | H04N 19/124 |
| 2022/0109852 A1* | 4/2022 | Xu | H04N 19/139 |

OTHER PUBLICATIONS

Flynn et al., "High Efficiency Video Coding (HEVC) Range Extensions text specification: Draft 6," (Joint 31 Collaborative Team on Video Coding of ITU-T SG.16 WP 3 and ISO/IEC JTC1/SC29/WG11); Document: JCTVC-P1005_v1, Jan. 9-17, 2014, 368 pp. [uploaded in parts].

ITU-T H.233, Series H: Audiovisual and Multimedia Systems, Infrastructure of audiovisual services—Transmission multiplexing and synchronization; Multiplexing protocol for low bit rate multimedia communication, The International Telecommunication Union. Jul. 2001, 74 pp.

Joshi, et al., "RCE2 subtest C.2: Extension of residual DPCM to lossy coding", JCT-VC Meeting; Jul. 25-Aug. 2, 2013; Vienna; (Joint Collaborative Team on Video Coding of ISO/IEC JTC1/SC29/WG11 and ITU-T SG.16 ); URL: http://wftp3.itu.int/av-arch/jctvc-site/,, No. JCTVC-N0052, Jul. 16, 2013; XP030114481, 3 pp.

Naccari, et al., "RCE2: Experimental results for Test C.1" Joint Collaborative Team on Video Coding (JCT-VC) of ITU-T SG 16 WP 3 and ISO/IEC JTC 1/SC 29/WG 11 14th Meeting: Vienna, AT, Jul. 25-Aug. 2, 2013; Document JCTVC-N0074, Jul. 12, 2013, 6 pp.

Sole, et al., "RCE2 Test B.1: Residue Rotation and Significance Map Context," Joint Collaborative Team on Video Coding (JCT-VC) of ITU-T SG 16 WP 3 and ISO/IEC JTC 1/SC 29/WG 11, 14th Meeting, Jul. 25-Aug. 2, 2013; Document: JCTVC-N0044, Vienna, AT, Jul. 9, 2013, 7 pp.

Wang, et al., "High Efficiency Video Coding (HEVC) Defect Report 2," Joint Collaboration Team of Video Coding, ITU-T SG 16 WP 3 and ISO/IEC JTC 1/SC 29/WG 11, Oct. 23-Nov. 1, 2013, Document JCTVC-O1003_V2, 311 pp. [uploaded in parts].

Wu, et al., "Wavelet Based Distributed Video Coding with Spatial Scalability," IEEE International Symposium on Circuits and Systems (ISCAS), May 18-21, 2008, pp. 3458-3461.

Yu, et al., "Quantization with Hard-decision Partition and Adaptive Reconstruction Levels for low delay setting," MPEG Meeting; Jan. 24-28, 2011; Daegu; (Motion Picture Expert Group or ISO/IEC JTC1/SC29/WG11), No. m19162, Jan. 23, 2011, XP030047729, 4 pp.

Zhou, et al., "RCE2: Experimental results on Test 3 and Test 4," JCT-VC Meeting; MPEG Meeting; Apr. 18-26, 2013 (Joint Collaborative Team on Video Coding of ISO/IEC JTC1/SC29/WG11 and ITU-T SG.16); Document JCTVC-M0056, 13 pp.

Zou, et al., "Quantization rounding for RDPCM," JCT-VC Meeting; Mar. 27-Apr. 4, 2014; Valencia; (Joint Collaborative Team on Video Coding of ISO/IEC JTC1/SC29/WG11 and ITU-T SG.16); URL:http://wftp3.itu.int/av-arch/jctvc-site/,, No. JCTVC-Q0148, Mar. 18, 2014, XP030116083, 3 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting Seneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (For FDIS & Last Call)," 12th Meeting Seneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

"Joint Call for Proposals for Coding of Screen Content," (Visual Coding group of ITU-T Q6/16 and ISO/IEC/JTC1/SC29/WG11) presented in the Jan. 17, 2014 meeting, San Jose, California. URL: http://www.itu.int/en/ITU-T/studygroups/com16/video/Documents/CfP-HEVC-coding-screen-content.pdf. 15 pp.

Balle, et al., "Extended Texture Pediction for H.264/AVC Intra Coding", VCEG Meeting; MPEG Meeting; Jan. 15-16, 2007; Marrakech; (Video Coding Experts Group of ITU-T SG.16), No. VCEG -AE11, Jan. 14, 2007; XP030003514, 7 pp.

Flynn et al., "Range Extensions Draft 4," JCT-VC Meeting; Apr. 18-26, 2013, Vienna, (Joint Collaborative Team on Video Coding of ISO/IEC JTC1/SC29/WG11 and ITU-T SG.16 ); URL: http://wftp3.itu.int/av-arch/jctvc-site/, No. JCTVC-N1005-v3, Aug. 8, 2013, XP030114950, 321 pp.

Joshi et al., "AHG8: Residual DPCM for Visually Lossless Coding", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0351, Apr. 10, 2013, XP030114308, 3 pp.

Joshi, et al., "AHG8: Use of Inter RDPCM for Blocks Using Intra Block Copy Mode ", JCT-VC Meeting; Oct. 23-Nov. 1, 2013, Geneva, (Joint Collaborative Team on Video Coding of ISO/IEC JTC1/SC29/WG11 and ITU-T SG.16) URL: http://wftp3.itu.int/av-arch/jctvc-site/, No. JCTVC-00170-v3, Oct. 25, 2013, XP030115198, 5 pp.

Joshi, et al., "Non-RCE2: Extension of Residual DPCM for Lossless Coding ", JCT-VC Meeting, MPEG Meeting, Apr. 18-26, 2013; Incheon; (Joint Collaborative Team on Video Coding of ISO/IEC JTC1/SC29/WG11 and ITU-T SG.16), URL: http://wftp3.itu.int/av-arch/jctvc-site/, No. JCTVC-M0288, Apr. 9, 2013, XP030114245, 5 pp.

Lee, et al., "AHG7: Residual DPCM for HEVC lossless coding," Samsung Electronics Co., Ltd., Joint Collaborative Team on Video Coding (JCT-VC) of ITU-T SG16 WP 3 and ISO/IEC JTC1/SC 29/WG 11, JCTVC-L0117, 12th Meeting: Geneva, CH, Jan. 14-23, 2013, XP030113605, 6 pp.

International Search Report from International Application No. PCT/US2014/052955, dated Oct. 22, 2014, 13 pp.

(56) References Cited

OTHER PUBLICATIONS

Response to Written Opinion dated Oct. 22, 2014, from International Application No. PCT/US2014/052955, filed on Jun. 26, 2015, 25 pp.
Second Written Opinion from International Application No. PCT/US2014/052955, dated Jul. 22, 2015, 7 pp.
Response to Second Written Opinion dated Jul. 22, 2015, from International Application No. PCT/US2014/052955, filed on Sep. 22, 2015, 5 pp.
International Preliminary Report on Patentability from International Application No. PCT/US2014/052955, dated Nov. 6, 2015, 9 pp.
Pang, et al., "Non-RCE3: Intra Motion Compensation with 2-D MVs", JCT-VC Meeting; Jul. 25-Aug. 2, 2013; Vienna; (Joint Collaborative Team on Video Coding of ISO/IEC JTC1/SC29/WG11 and ITU-TSG . 16 ) ; URL : http://wftp3.itu.int/av-arch/jctvc-site/,, No. JCTVC-N0256-v4, Aug. 2, 2013 , pp. 1-12, XP030114777.
Naccari, et al., "Inter-Prediction Residual DPCM," JCT-VC Meeting; MPEG Meeting; Apr. 18-26, 2013 (Joint Collaborative Team on Video Coding of ISO/IEC JTC1/SC29/WG11 and ITU-T SG.16) Document JCTVC-M0442_r1, 12 pp.
Joshi R., et al., "RCE2: Experimental results for Test D.1", Joint Collaborative Team on Video Coding (JCT-VC) 14th Meeting: Vienna, JCTVC-N0083-r1.zip, Aug. 2, 2013, JCTVC-N0083-r1.doc, 4 pages.

\* cited by examiner

RESIDUAL PREDICTION FOR INTRA BLOCK COPYING

This application claims the benefit of U.S. Provisional Patent Application No. 61/870,654, filed Aug. 27, 2013, and U.S. Provisional Patent Application No. 61/871,252, filed Aug. 28, 2013, the entire contents of which are incorporated herein by reference.

TECHNICAL FIELD

This disclosure relates to video coding, and more particularly to techniques for predicting video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video picture or slice may be partitioned into blocks. Each block can be further partitioned. Blocks in an intra-coded (I) picture or slice are encoded using spatial prediction with respect to reference samples in neighboring blocks in the same picture or slice. Blocks in an inter-coded (P or B) picture or slice may use spatial prediction with respect to reference samples in neighboring blocks in the same picture or slice or temporal prediction with respect to reference samples in other reference pictures. Spatial or temporal prediction results in a predictive block (which may also be referred to as a "prediction block") for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

Techniques of this disclosure generally relate to predicting data in video coding. For example, the techniques described in this disclosure may provide support for applying both intra-block copying (intra-BC) and residue differential pulse code modulation (RDPCM) in video coding. In an example, the techniques of this disclosure may include predicting residual data of an intra-BC predicted block using RDPCM.

In an example, a method of decoding video data includes generating a residual block of a picture based on a predicted residual block including reconstructing one or more residual values of the residual block based on one or more predicted residual values of the residual block, and generating a current block of the picture based on a combination of the residual block and a prediction block of the picture.

In another example, a method of encoding video data includes generating a residual block for a current block of a picture based on a difference between the current block and a prediction block of the picture, generating a predicted residual block based on the residual block by predicting one or more residual values of the residual block based on one or more other residual values of the residual block, and encoding data that represents the predicted residual block in a bitstream.

In another example, device for of decoding video data includes a memory storing the video data, and a video decoder configured to generate a residual block of a picture based on a predicted residual block including reconstructing one or more residual values of the residual block based on one or more predicted residual values of the residual block, and generate a current block of the picture based on a combination of the residual block and a prediction block of the picture.

In another example, a device for encoding video data includes a memory storing the video data, and a video encoder configured to generate a residual block for a current block of a picture based on a difference between the current block and a prediction block of the picture, generate a predicted residual block based on the residual block by predicting one or more residual values of the residual block based on one or more other residual values of the residual block, and encode data that represents the predicted residual block in a bitstream.

In another example, an device for decoding video data includes means for generating a residual block of a picture based on a predicted residual block including reconstructing one or more residual values of the residual block based on one or more predicted residual values of the residual block, and means for generating a current block of the picture based on a combination of the residual block and a prediction block of the picture.

In another example, a device for encoding video data includes means for generating a residual block for a current block of a picture based on a difference between the current block and a prediction block of the picture, means for generating a predicted residual block based on the residual block by predicting one or more residual values of the residual block based on one or more other residual values of the residual block, and means for encoding data that represents the predicted residual block in a bitstream.

In another example, a non-transitory computer-readable medium has instructions stored thereon that, when executed, cause one or more processors to generate a residual block of a picture based on a predicted residual block including reconstructing one or more residual values of the residual block based on one or more predicted residual values of the residual block, and generate a current block of the picture based on a combination of the residual block and a prediction block of the picture.

In another example, a non-transitory computer-readable medium has instructions stored thereon that, when executed, cause one or more processors to generate a residual block for a current block of a picture based on a difference between the current block and a prediction block of the picture, generate a predicted residual block based on the residual block by predicting one or more residual values of the residual block based on one or more other residual values of the residual block, and encode data that represents the predicted residual block in a bitstream.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
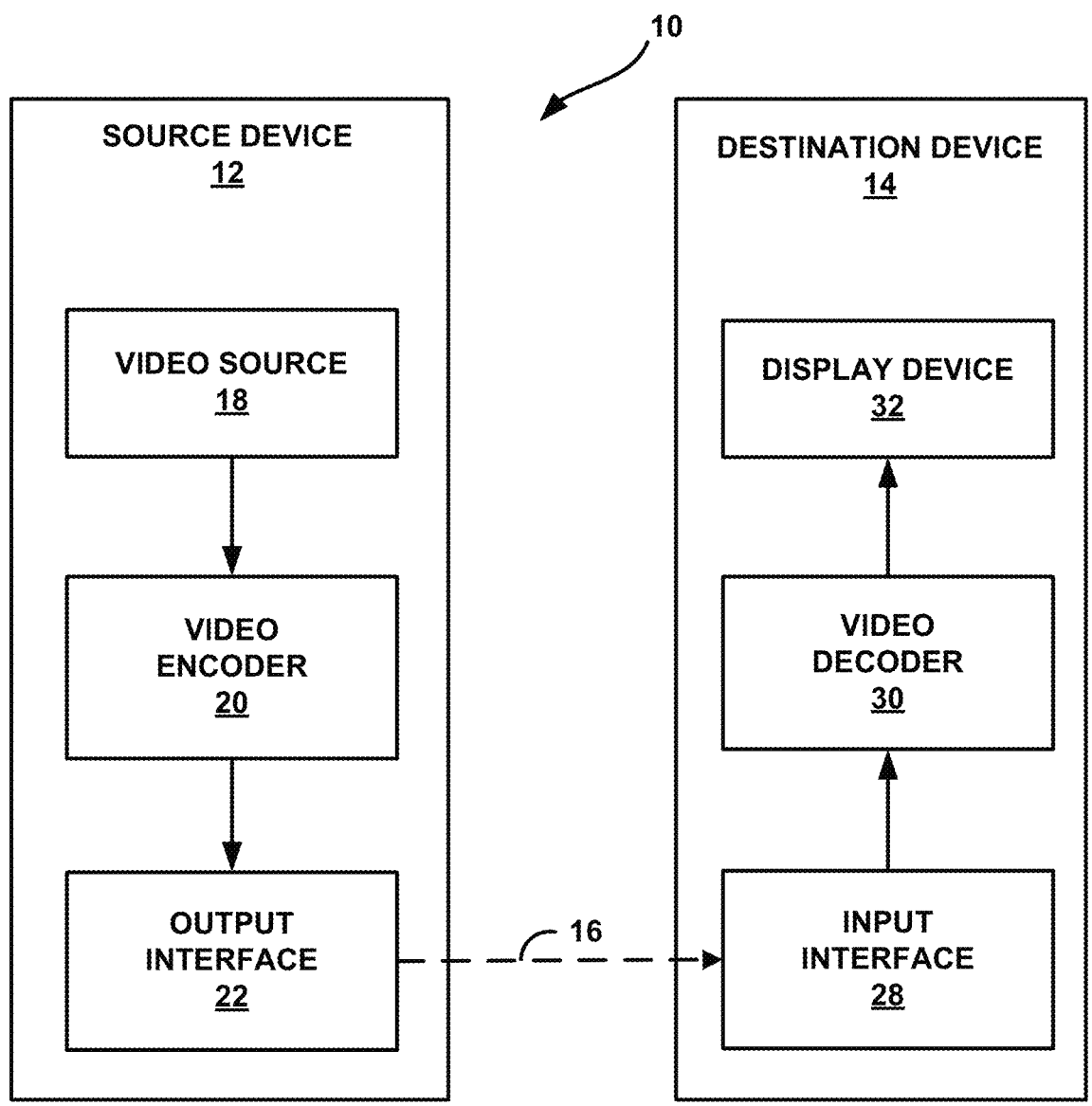
FIG. 1 is a block diagram illustrating an example video encoding and decoding system that may implement the techniques of this disclosure.

Aspects of this disclosure generally relate to video coding and compression. In some examples, the techniques may be related to a High Efficiency Video Coding (HEVC) Range Extension. HEVC is a video coding standard that was recently developed by the Joint Collaborative Team on Video Coding (JCT-VC) of ITU-T WP3/16 and ISO/IEC JTC 1/SC 29/WG 11. In general, the HEVC Range Extension may support video formats that are not specifically supported by the base HEVC specification.

The techniques may also relate to an HEVC screen contents coding extension to HEVC. More information for the screen contents coding extension of HEVC can be found in the document of the Visual Coding group of ITU-T Q6/16 and ISO/IEC/JTC 1/SC29/WG 11, entitled "Joint Call for Proposals for Coding of Screen Content," presented in the 17 Jan. 2014 meeting at San Jose, Calif. and available at: http://www.itu.int/en/ITU-T/studygroups/com16/video/Documents/CfP-HEVC-coding-screen-content.pdf.

The Range Extension of HEVC, the screen contents coding extension, or other video coding tools may support intra-block copying (intra-BC) and residue differential pulse code modulation (RDPCM). With respect to intra-BC, for many applications, such as remote desktop, remote gaming, wireless displays, automotive infotainment, and cloud computing to provide a few examples, the video contents in these applications are usually combinations of natural content, text, artificial graphics and the like. In test and artificial graphics regions, repeated patterns (such as characters, icons, and symbols to provide a few examples) often exist. Intra-BC may be characterized as a dedicated process to removal of this kind of redundancy, thereby potentially improving the intra-frame coding efficiency.

With respect to RDPCM, a video coder (such as a video encoder or video decoder) may apply RDPCM to intra-prediction residual (e.g., residual predicted using one of the 35 directional HEVC intra-modes) or to motion compensated prediction residual (e.g., residual predicted using temporal motion prediction) to reduce the amount of data of a residual block that needs to be output for the residual block. In RDPCM, the video encoder predicts the residual values of a row or column of a residual block based on the residual values of the previous row or column. In general, RDPCM may include three different modes: RDPCM-off, RDPCM-horizontal and RDPCM-vertical. For RDPCM-off, the video coder may not apply RDPCM. For RDPCM horizontal, the video coder may use the residual samples in the left column to predict the residual samples in the current column. For RDPCM vertical, the video coder may use residual samples in the upper row to predict the residual samples in the current row.

As an example, to perform vertical RDPCM, the video encoder subtracts the residual values of row 1 from the reconstructed residual values of row 0 (e.g., subtract the first residual value of row 1 from the first residual value of row 0, subtract the second residual value of row 1 from the second residual value of row 0, and so forth). For row 0, the video encoder signals the residual values, but for row 1, the video encoder signals the difference values, and for row 2, the video encoder signals the difference values with the reconstructed values of row 1, and so forth. The video encoder may perform a similar technique for horizontal based RDPCM. Subtraction, as described in this disclosure, refers to determining values equal to the result of subtracting, and can be performed by subtracting or adding a negative of value.

In some examples, encoding the difference between residual values of successive rows or columns may result in fewer bits than encoding the actual residual values. In this manner, RDPCM may result in a reduction in the amount of data the video encoder needs to signal, thereby promoting bandwidth efficiency.

In the example above, the video decoder decodes the received values. For instance, the video decoder decodes the residual values for row 0, and decodes the difference values for row 1. For example, the video decoder may dequantize the received values for row 0 and row 1. The video decoder adds the residual values for row 0 with the difference values to determine the residual values for row 1. The video decoder also decodes the difference values for row 2 (e.g., the difference between the residual values of row 1 and the residual values of row 2). The video decoder adds the determined residual values for row 1 with the difference values of row 2 to determine the residual values of row 2, and so forth. The video decoder may implement similar steps for horizontal based RDPCM.

In some examples, the video encoder may utilize RDPCM only in conjunction with certain other coding tools. For example, the video encoder may utilize lossless (also referred to as bypass) or transform-skip coding to generate the residual block or a quantized version of the residual block, respectively. In some examples, the video encoder may utilize RDPCM only if the residual block is transform-bypass or transform-skip encoded. If a transform is applied to the residual block, then RDPCM may not be available to the video encoder.

At the JCTVC meeting in Vienna (July 2013), both intra-BC and RDPCM were adopted in the HEVC Range Extension standard noted above. However, there were no techniques for reducing an amount of residual data being signaled when using an intra-BC mode to generate prediction residual. That is, there were no techniques for applying RDPCM to residual data generated using an intra-BC mode.

The techniques described in this disclosure provide support for applying both RDPCM and intra-BC in video coding. For example, the techniques of this disclosure may include using an intra-BC prediction mode to generate residual data, and predicting the residual data of the intra-BC predicted block using RDPCM, as discussed in further detail below. The techniques of this disclosure may further improve efficiency when applying intra-BC techniques. For example, by applying RDPCM to a block that has been predicted using intra-BC techniques, residual data may be further decreased, thereby reducing an amount of data that is included in an encoded bitstream and increasing overall coding efficiency. That is, the prediction block described above (in which RDPCM is applied to intra-BC prediction residual) may require fewer bits to represent in a bitstream than a residual block predicted using an intra-BC mode without applying RDPCM.

FIG. 1 is a block diagram illustrating an example video encoding and decoding system 10 that may utilize techniques for filtering video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for performing transformation in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for performing filtering in video coding may be performed by any digital video encoding and/or decoding device. Although generally the techniques of this disclosure are performed by a video encoding device, the techniques may also be performed by a video codec. Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (codec). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 24) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the ITU-T H.264 standard, alternatively referred to as MPEG-4, Part 10, Advanced Video Coding (AVC), or extensions of such standards. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. Other examples of video compression standards include MPEG-2 and ITU-T H.263.

While the techniques of this disclosure are not limited to any particular coding standard, the techniques may be relevant to the HEVC standard. The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive coding tree units (CTUs). Each of the CTUs may comprise a coding tree block of luma samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block.

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

TUs may include coefficients in the transform domain following application of a transform, e.g., a discrete cosine transform (DCT), an integer transform, a wavelet transform, or a conceptually similar transform to residual video data.

The residual data may correspond to pixel differences between pixels of the unencoded picture and prediction values corresponding to the PUs. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. For entropy coding, video encoder 20 scans the quantized transform coefficients according to a particular scan order (e.g., vertical scan, horizontal scan, or diagonal scan). Video encoder 20 may output the entropy-encoded syntax elements in a bitstream.

Hence, the bitstream may include a sequence of bits that forms a coded representation of the video data. The bitstream may include coded pictures and associated data. A coded picture is a coded representation of a picture. The associated data may include video parameter sets (VPSs), sequence parameter sets (SPSs), picture parameter sets (PPSs), and other syntax structures. A SPS may contain parameters applicable to zero or more sequences of pictures. A PPS may contain parameters applicable to zero or more pictures.

Transforming and quantizing the residual block causes loss of information (e.g., inverse quantized and inverse transformed block is different than the original residual block). Accordingly, examples of video coding where the residual block is transformed and quantized are referred to as lossy coding. In some examples, video encoder 20 may skip the transform of the residual block, but quantizes the residual block. Such examples of video coding are referred to as transform-skip coding. Transform-skip coding may be one variation of lossy coding because the quantization causes of loss of information. To avoid confusion, lossy coding is used in this description to refer to video coding methods that include both transform and quantization, and transform-skip coding is used in this description to refer to video coding methods in which the transform is skipped, but quantization is still performed.

Video encoder 20 need not perform transform-skip coding or lossy coding in all cases. In some examples, video encoder 20 may perform lossless coding. In lossless coding (sometimes referred to as transquant bypass), video encoder 20 does not transform the residual block and does not quantize the residual block. In this example, the residual block, as reconstructed by video decoder 30, is identical to the residual block generated by video encoder 20, whereas for lossy coding and transform-skip coding, the residual block, as reconstructed by video decoder 30, may be slightly different than the residual block generated by video encoder 20.

In other words, when transform is applied, the transform converts the residual values of the residual block from a pixel domain to a transform domain. In some examples, for transform skip or transform bypass, the residual data includes residual values from the difference between the predictive block and the current block without a transform applied to the residual values that converts the residual values from a pixel domain to a transform domain.

Video decoder 30, upon obtaining the coded video data, may perform a decoding pass generally reciprocal to the encoding pass described with respect to video encoder 20. For example, video decoder 30 may obtain an encoded video bitstream that represents video blocks of an encoded video slice and associated syntax elements from video encoder 20. Video decoder 30 may reconstruct the original, unencoded video sequence (e.g., or a quantized version of the original residue for lossy coding) using the data contained in the bitstream. For example, for lossy coding, video decoder 30 may entropy decode syntax elements in the bitstream to determine quantized transform coefficients. Video decoder 30 may utilize the same scan order that video encoder 20 utilized to construct a quantized residual block. Video decoder 30 may then inverse quantize the quantized transform coefficients to determine the transform coefficients. Video decoder 30 may also apply an inverse transform to the transform coefficients to determine the coefficients of the residual block.

For transform-skip coding, video decoder 30 may entropy decode syntax elements in the bitstream to determine quantized coefficients, utilize the same scan order that video encoder 20 utilized to construct a quantized residual block, and then inverse quantize the quantized coefficients to determine the coefficients of the residual block. No inverse transform is needed because transform was skipped in the encoding process.

For lossless coding (e.g., transform bypass or simply bypass), video decoder 30 may entropy decode syntax elements in the bitstream and may utilize the same scan order video encoder 20 used to directly determine the coefficients of the residual block. No inverse quantizing or transform is needed because both transform and quantization was skipped in the encoding process.

In any case, video decoder 30 determines a predictive block. The predictive block may be located in the same picture (e.g., for intra-prediction or for intra-BC prediction) or in a different picture (e.g., for inter-prediction) as the current block. Video decoder 30 uses reconstructed pixel values in the predictive block and the corresponding residual values in the residual block (e.g., as obtained from the encoded bitstream) to reconstruct pixel values of the current block (e.g., to decode the current block).

In some instances, video encoder 20 and video decoder 30 may predict one or more residual values of a block using one or more other residual values from the block. For example, video encoder 20 may divide a residual block into one or more TUs. A "residual block" may generically refer to a block whose coefficients are to be entropy encoded (e.g., by video encoder 20) or entropy decoded (e.g., by video decoder 30). For instance, if video encoder 20 does not further divide the block resulting from the difference between the current block and a predictive block to generate a single TU, then the residual block corresponds the TU. If video encoder 20 divides the block resulting from the difference between the current block and a predictive block to generate a plurality of TUs, then the residual block corresponds to one of the plurality of TUs.

For inter-predicted blocks, video encoder 20 may explicitly signal whether RDPCM is on or off (e.g., whether RDPCM is applied or not) and direction of the RDPCM (if applied). Video decoder 30 may obtain the RDPCM syntax elements from the bitstream and apply RDPCM accordingly.

In some examples, video encoder 20 may provide the signaling at the TU level. In these examples, the block resulting from the difference between the predictive block and the original block is divided into TUs. Video encoder 20 then signals information (e.g., syntax elements such as a flag) indicating whether RDPCM is applied or not and information of the direction of the RDPCM (if applied) for each TU. In other examples, rather than at the TU level, video encoder 20 may signal the information indicating whether RDPCM is applied or not and the direction (e.g., mode/direction information of RDPCM) at CU or PU level. In these examples, the same mode/direction would be applicable to all TUs.

For intra-predicted blocks, video encoder 20 and video decoder 30 may apply RDPCM in the same manner, e.g., according to an intra-prediction direction. For example, for a horizontal intra-prediction mode, video encoder 20 may apply horizontal RDPCM, and for a vertical intra-prediction mode, video encoder 20 may apply vertical RDPCM. In some instances, video encoder 20 and video decoder 30 may not apply RDPCM for directional intra-prediction modes other than vertical and horizontal.

If RDPCM is applied for an intra-predicted block, video encoder 20 may not signal the RDPCM mode (e.g., RDPCM direction) in the bitstream. Rather, video encoder 20 may signal information indicating the intra-prediction mode, and video decoder 30 may determine that the RDPCM direction is the same as the intra-prediction mode, in this example. In this way, for TUs (e.g., residual blocks) generated from intra-prediction, the application of RDPCM may be implicit, in that video encoder 20 may not signal information indicating the RDPCM direction. Rather, video decoder 30 simply determines the RDPCM mode (e.g., RDPCM direction) based on the intra-mode that is signaled for intra-predicted blocks.

Hence, while explicit and implicit signaling mechanisms are provided for applying RDPCM to inter-predicted data and intra-predicted data, respectively, RDPCM was not previously applied to intra-BC predicted residual. Accordingly, was not previously signaling mechanisms to indicate whether (and how) to apply RDPCM to intra-BC predicted residual.

According to aspects of this disclosure, video encoder 20 and/or video decoder 30 may apply intra-BC in conjunction with RDPCM. For example, video encoder 20 may generate a residual block for a current block of a picture based on a difference between the current block and a prediction block of the picture. Video encoder 20 may then generate a predicted residual block based on the residual block by predicting one or more residual values of the residual block based on one or more other residual values of the residual block. Video encoder 20 may then encode data that represents the predicted residual block in a bitstream.

For example, video encoder 20 may perform an intra-BC process to generate the residual block. As noted above, intra-BC may be a dedicated process that removes redundancy within a picture. As described in greater detail with respect to FIG. 4 below, for example, video encoder 20 may obtain a residual block for a CU being coded from an already reconstructed region in the same picture. In some instances, video encoder 20 may determine an offset vector that identifies the predictive block in the reconstructed region and may encode the offset vector (also referred to as a displacement vector or motion vector) together with the residue signal. In this way, the offset vector indicates the position of the predictive block in the picture used to generate the residual block as displaced from the current CU.

According to aspects of this disclosure, video encoder 20 may then generate the predicted residual block based on the intra-BC residual block by predicting one or more residual values of the residual block based on one or more other residual values of the residual block. For example, video encoder 20 may perform an RDPCM process on the residual block to generate the prediction block. Video encoder 20 may apply RDPCM by selecting one of three different RDPCM modes, including DPCM-off, RDPCM-horizontal and RDPCM-vertical. For RDPCM-off, video encoder 20 may not apply RDPCM. For RDPCM horizontal, video encoder 20 may use pixel positions to the left of the pixel being coded, e.g., reconstructed residual values in the left column to predict the current residual value. For RDPCM vertical, video encoder 20 may use pixel positions above the pixel being coded, e.g., reconstructed residual values in the upper row to predict the current residual value. Accordingly, after applying RDPCM, the block may include predicted residual values of the original residual block.

According to aspects of this disclosure, video decoder 30 may generate a residual block of a picture based on a predicted residual block, where determining the residual block includes reconstructing one or more residual values of the residual block based on one or more predicted residual values of the residual block. Video decoder 30 then generates a current block of the picture based on a combination of the residual block and a prediction block of the picture.

For example, video decoder 30 may use an RDPCM process to generate the residual block of the picture based on the predicted residual block. As noted above with respect to video encoder 20, video decoder 30 may apply RDPCM by selecting one of three different RDPCM modes, including DPCM-off, RDPCM-horizontal and RDPCM-vertical. Video decoder 30 may obtain one or more syntax elements from an encoded bitstream that indicate the RDPCM mode.

Video decoder 30 may then perform an intra-BC prediction process to generate the current block of the picture. For example, video decoder 30 may obtain an offset vector from an encoded bitstream that indicates a location of a prediction block that is included in an already reconstructed portion of the picture being decoded. Video decoder may then combine the prediction block with the determined residual to generate (reconstruct) the current block.

The techniques of this disclosure also relate to signaling associated with applying RDPCM to residual that has been generated using an intra-BC mode. According to aspects of this disclosure, video encoder 20 may encode an indication of whether to apply RDPCM to blocks predicted using intra-BC. In some examples, video encoder 20 may encode one or more syntax elements for indicating whether to apply RDPCM in a manner similar to the explicit signaling described above with respect to inter-predicted data. For example, when predicting blocks using intra-BC, video encoder 20 may explicitly signal whether RDPCM is on or off (e.g., whether RDPCM is applied or not) and a direction of the RDPCM (if applied). Video decoder 30 may obtain the RDPCM syntax elements from the bitstream and apply RDPCM accordingly.

According to aspects of this disclosure. RDPCM may be enabled (or disabled) at a sequence level, e.g., according to one or more syntax elements included in an SPS. For example, video encoder 20 may encode one or more syntax elements indicating whether RDPCM is enabled. In some examples, the one or more syntax elements may be applicable to more than one prediction mode (e.g., where prediction modes include inter-prediction mode, intra-prediction mode, and intra-BC prediction mode). For example, video encoder 20 may encode a residual_dpcm_inter_enabled_flag syntax element (or a similar syntax element) to indicate whether RDPCM is enabled for both inter-predicted residual and intra-BC predicted residual (e.g., the flag is applicable to both modes such that one flag is signaled for both inter-prediction mode and intra-BC prediction mode). Video decoder 30 may decode such a flag from the bitstream and determine whether RDPCM is enabled. When enabled, one or more additional syntax elements may be explicitly signaled to indicate whether RDPCM is on or off for a block (e.g., whether RDPCM is applied or not) and a direction of the RDPCM for the block (if applied).

Figure 2:
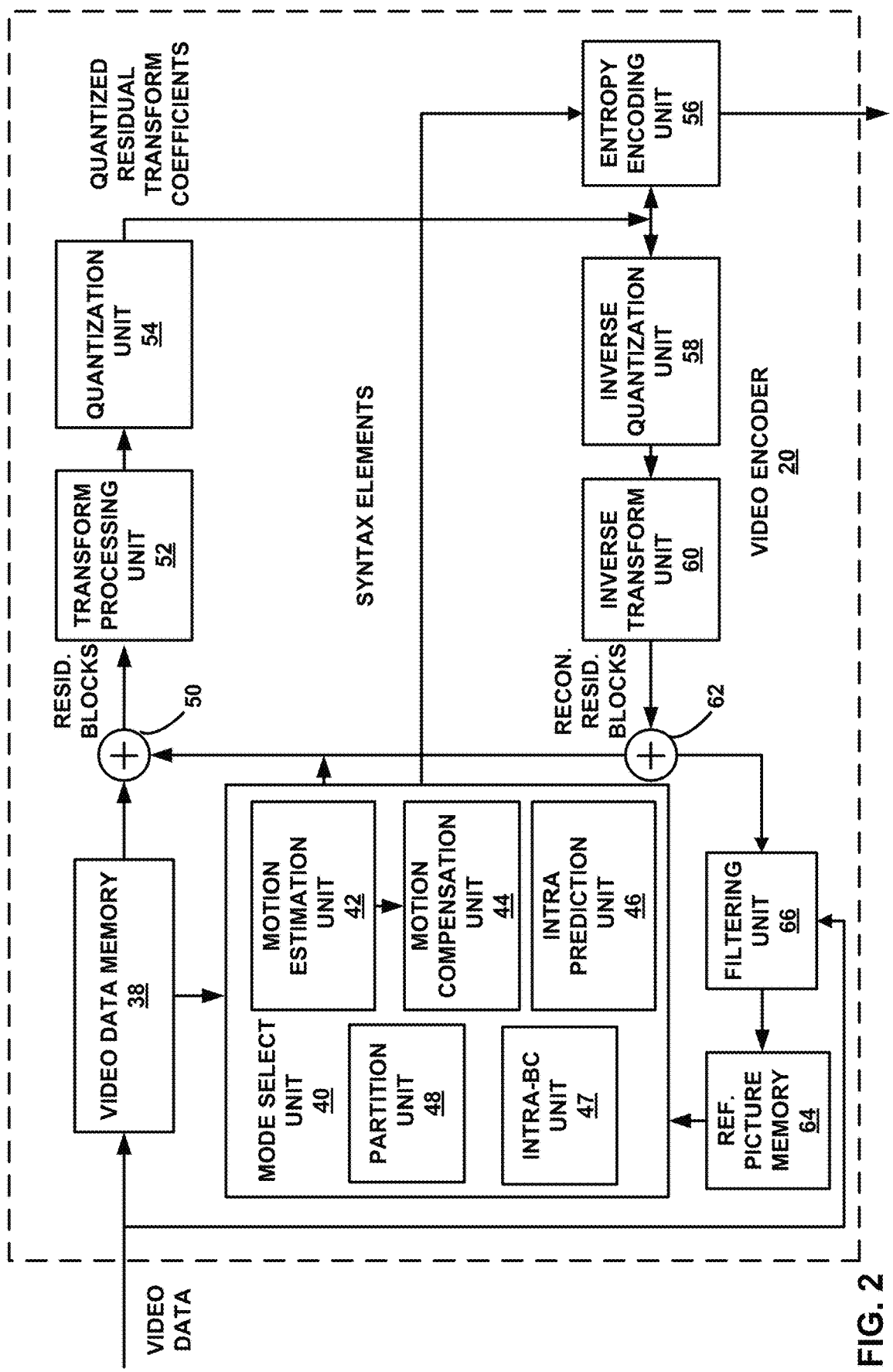
FIG. 2 is a block diagram illustrating an example video encoder that may implement the techniques of this disclosure.

FIG. 2 is a block diagram illustrating an example of a video encoder 20 that may use techniques for transformation as described in this disclosure. The video encoder 20 will be described in the context of HEVC coding for purposes of illustration, but without limitation of this disclosure as to other coding standards.

Video encoder 20 may perform intra- and inter-coding of video blocks within video slices. Intra-coding relies on spatial prediction to reduce or remove spatial redundancy in video within a given video picture. Inter-coding relies on temporal prediction to reduce or remove temporal redundancy in video within adjacent pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes video data memory 38, mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, intra-BC unit 47, and partition unit 48. For video block reconstruction, video encoder 20 also includes inverse quantization unit 58, inverse transform unit 60, summer 62, and filtering unit 66.

Video data memory 38 may store video data to be encoded by the components of video encoder 20. The video data stored in video data memory 38 may be obtained, for example, from video source 18. Reference picture memory 64 may be referred to as a decoded picture buffer that stores reference video data for use in encoding video data by video encoder 20, e.g., in intra- or inter-coding modes. Video data memory 38 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 38 and reference picture memory 64 may be provided by the same memory device or separate memory devices. In various examples, video data memory 38 may be on-chip with other components of video encoder 20, or off-chip relative to those components.

During the encoding process, video encoder 20 receives a video picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring pixel values in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block.

Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

Filtering unit 66 may perform a variety of filtering processes. For example, filtering unit 66 may perform deblocking. That is, filtering unit 66 may receive a plurality of reconstructed video blocks forming a slice or a frame of reconstructed video and filter block boundaries to remove blockiness artifacts from a slice or frame. In one example, filtering unit 66 evaluates the so-called "boundary strength" of a video block. Based on the boundary strength of a video block, edge pixels of a video block may be filtered with respect to edge pixels of an adjacent video block such that the transition from one video block are more difficult for a viewer to perceive.

While the example of FIG. 2 generally illustrates video encoder 20 as a video encoder for performing lossy coding, the techniques of this disclosure may also be applied to lossless video coding. In some examples, lossless coding eliminates transforms and quantization. In other examples, lossless coding performs transforms and eliminates only the quantization process. In still other examples, lossless coding may be implemented with the use of transforms and quantitation, but the quantization parameter may be selected so as to avoid any quantization data loss. These and other examples are within the scope of this disclosure. In such instances, video encoder 20 may include components for performing transform skipping, quantization skipping, or other lossless coding techniques.

In accordance with various aspects of the techniques described in this disclosure, video encoder 20 may generate a residual block for a current block of a picture based on a difference between the current block and a prediction block of the picture. For example, intra-BC unit 47 may apply an intra-BC process to generate the residual block (as illustrated and described, for example, with respect to FIG. 4).

In addition, according to aspects of this disclosure, video encoder 20 generate a predicted residual block based on the residual block by predicting one or more residual values of the residual block based on one or more other values of the residual block. For example, intra-BC unit 47 may apply RDPCM to further compress the residual block. Video encoder 20 may then encode the predicted residual block, for example, by quantizing the predicted residual block using quantization unit 54, and entropy coding the quantized values.

While a number of different aspects and examples of the techniques are described in this disclosure, the various aspects and examples of the techniques may be performed together or separately from one another. In other words, the techniques should not be limited strictly to the various aspects and examples described above, but may be used in combination or performed together and/or separately. In addition, while certain techniques may be ascribed to certain units of video encoder 20 (such as intra-BC unit 47, motion compensation unit 44, or entropy encoding unit 56) it should be understood that one or more other units of video encoder 20 may also be responsible for carrying out such techniques.

Figure 3:
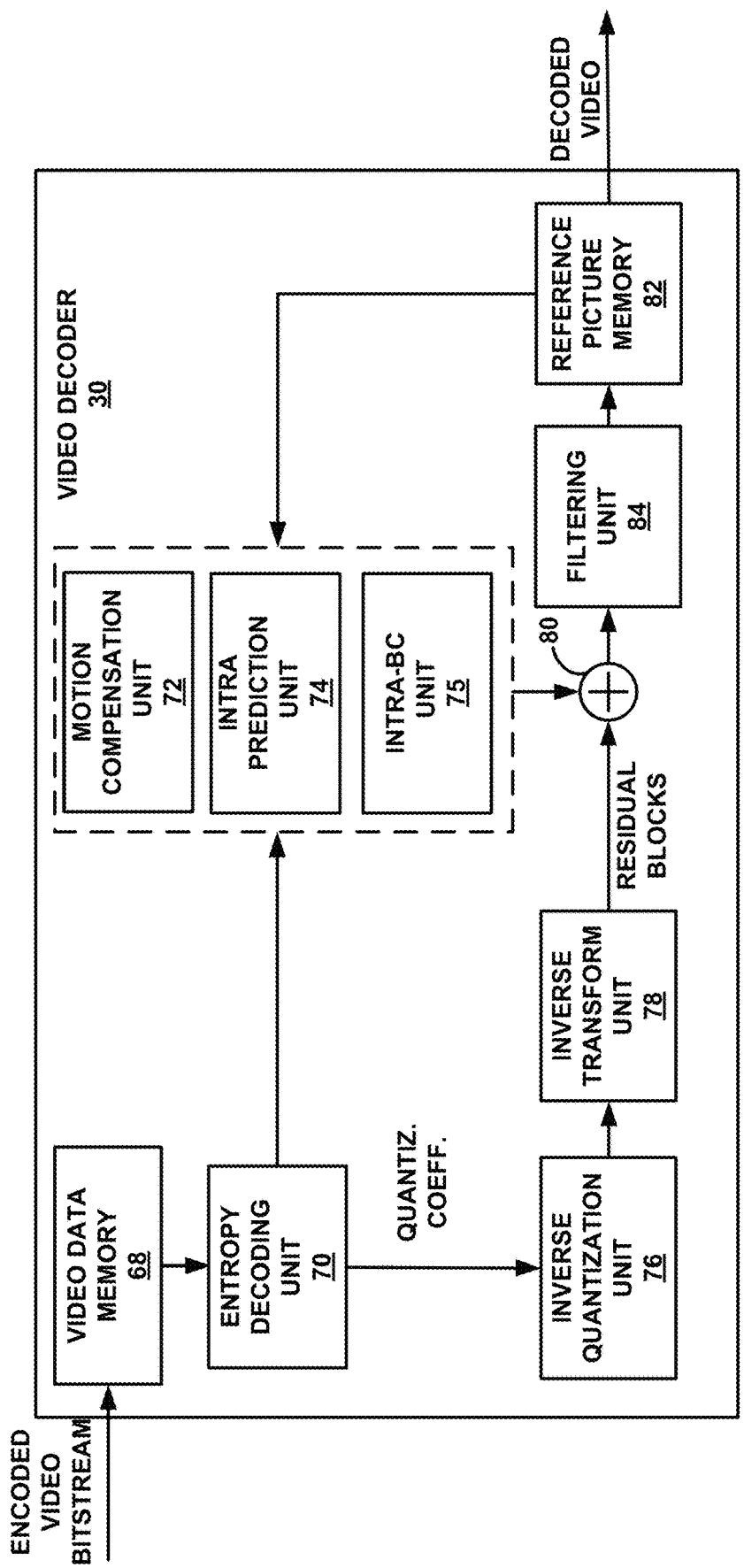
FIG. 3 is a block diagram illustrating an example video decoder that may implement the techniques of this disclosure.

FIG. 3 is a block diagram illustrating an example of video decoder 30 that may implement techniques for transformation as described in this disclosure. Again, the video decoder 30 will be described in the context of HEVC coding for purposes of illustration, but without limitation of this disclosure as to other coding standards.

In the example of FIG. 3, video decoder 30 includes video data memory 68, an entropy decoding unit 70, motion compensation unit 72, intra-prediction unit 74, intra-BC unit 75, inverse quantization unit 76, inverse transformation unit 78, reference picture memory 82, summer 80, and filtering unit 84.

Video data memory 68 may store video data, such as an encoded video bitstream, to be decoded by the components of video decoder 30. The video data stored in video data memory 68 may be obtained, for example, from computer-readable medium 16, e.g., from a local video source, such as a camera, via wired or wireless network communication of video data, or by accessing physical data storage media. Video data memory 68 may form a coded picture buffer (CPB) that stores encoded video data from an encoded video bitstream. Reference picture memory 82 may be referred to as a decoded picture buffer that stores reference video data for use in decoding video data by video decoder 30, e.g., in intra- or inter-coding modes. Video data memory 68 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 68 and reference picture memory 82 may be provided by the same memory device or separate memory devices. In various examples, video data memory 68 may be on-chip with other components of video decoder 30, or off-chip relative to those components During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra prediction mode and data from previously decoded blocks of the current picture. When the video picture is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain. Video decoder 30 forms a decoded video block by summing the residual blocks from inverse transform unit 78 with the corresponding predictive blocks generated by motion compensation unit 72. Summer 80 represents the component or components that perform this summation operation.

Filtering unit 84 may, in some examples, be configured similarly to filtering unit 66 of video encoder 20 (FIG. 2). For example, filtering unit 84 may be configured to perform deblocking. SAO, or other filtering operations when decoding and reconstructing video data from an encoded bitstream.

Again, as noted above with respect to FIG. 2, while the example of FIG. 3 generally illustrates video decoder 30 as a video encoder for performing lossy coding, the techniques of this disclosure may also be applied to lossless video coding. In some examples, lossless coding eliminates transforms and quantization. In other examples, lossless coding performs transforms and eliminates only the quantization process. In still other examples, lossless coding may be implemented with the use of transforms and quantitation, but the quantization parameter may be selected so as to avoid any quantization data loss. These and other examples are within the scope of this disclosure. In such instances, video decoder 30 may include components for performing transform skipping, quantization skipping, or other lossless coding techniques.

In some instances, video decoder 30 may perform one or more of the techniques described with respect to video encoder 20 above. For example, video decoder 30 may perform the techniques of this disclosure for applying both an intra-BC process and an RDPCM process to determine video data. In some examples, video decoder 30 may obtain one or more syntax elements from an encoded bitstream, and perform the techniques of this disclosure based on such syntax elements.

For example, in accordance with various aspects of the techniques described in this disclosure, video decoder 30 may perform RDPCM on received predicted residual to generate a residual block of a picture. That is, video decoder 30 may perform an inverse RDPCM process as that applied by video encoder 20.

In addition, video decoder 30, e.g., intra-BC unit 75 of video decoder 30, may determine a current block of the picture by combining the residual block of the picture and a block of the identified by an offset vector.

While a number of different aspects and examples of the techniques are described in this disclosure, the various aspects and examples of the techniques may be performed together or separately from one another. In other words, the techniques should not be limited strictly to the various aspects and examples described above, but may be used in combination or performed together and/or separately. In addition, while certain techniques may be ascribed to certain units of video decoder 30 it should be understood that one or more other units of video decoder 30 may also be responsible for carrying out such techniques.

Figure 4:
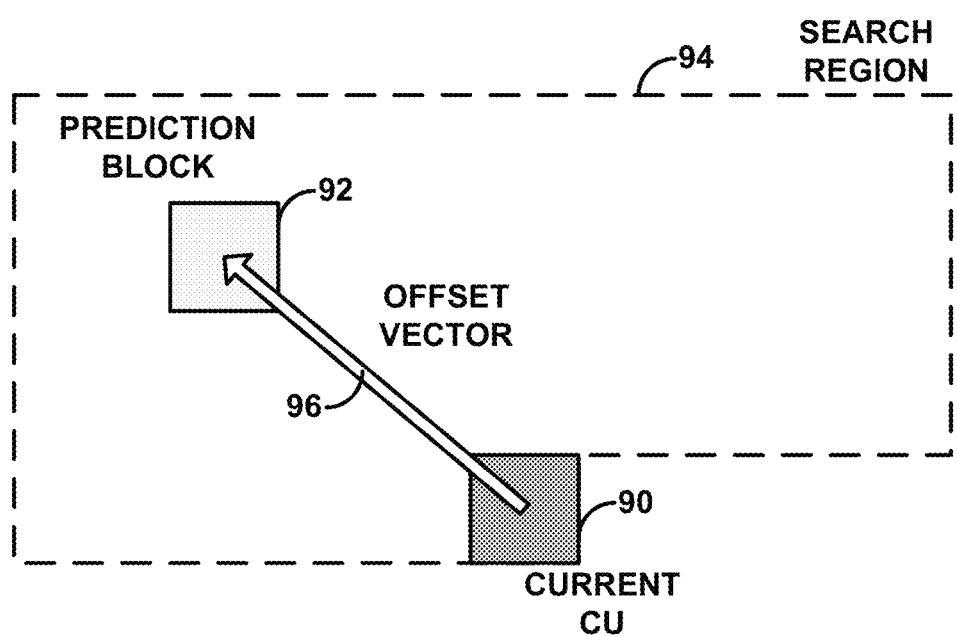
FIG. 4 is a diagram illustrating an example of an intra-block copying (intra-BC) process.

FIG. 4 is a diagram illustrating an example of an intra block copying process. The example of FIG. 4 includes a current coding unit (CU) 90, a prediction block 92 located in search region 94 and an offset vector 96. During encoding, video encoder 20 may encode residual for current CU 90 based on a difference between current CU 90 and prediction block 92 (which may also be referred to as a prediction signal). Video encoder 20 may locate prediction block 92 in search region 94, which has already been reconstructed in the same picture as current CU 90. Video encoder 20 may locate prediction block 92 using offset vector 96 (which may also be referred to as a "displacement vector").

Video encoder 20 may encode offset vector 96 together with the residue signal. For example, video encoder 20 may include one or more syntax elements that identify or define a horizontal displacement component of offset vector 96 and a vertical displacement component of offset vector in an encoded video bitstream. Video encoder 20 may also encode the residue, e.g., the difference between pixel values of current CU 90 and pixel values of prediction block 92. Video decoder 30 may decode the one or more syntax elements to determine offset vector 96, and use the determined vector to identify prediction block 92 for current CU 90. Video decoder 30 may also decode the residue. Video decoder 30 may reconstruct current CU 90 by combining the decoded residue with reconstructed pixel values of prediction block 92 (as identified by offset vector 96).

In some examples, the resolution of offset vector 96 may be integer pixel, e.g., be constrained to have integer pixel resolution. In such examples, the resolution of the horizontal displacement component and the vertical displacement component are integer pixel. In such examples, video encoder 20 and video decoder 30 need not interpolate pixel values of prediction block 92 to determine the predictor for current CU 90. In other examples, the resolution of one or both of the horizontal displacement component and the vertical displacement component may be sub-pixel in resolution. For example, one of the vertical and horizontal components may have integer pixel resolution, while the other has sub-pixel resolution.

According to aspects of this disclosure, video encoder 20 and/or video decoder 30 may code (encode or decode, respectively) blocks of video data using the intra-BC techniques shown in the example of FIG. 4. In addition, as described in greater detail below with respect to FIGS. 5A and 5B, video encoder 20 and/or video decoder may apply RDPCM to the residue that has been generated using the intra-BC techniques.

For example, as noted above, video encoder 20 may determine offset vector 96, which identifies a location of a block (i.e., prediction block 92) that closely matches current CU 90. Video encoder 20 may determine a residue based on a difference between current CU 90 and prediction block 92. According to aspects of this disclosure, video encoder 20 may then apply RDPCM to the determined residual. Video encoder 20 may encode the residual values that have been predicted using RDPCM, as well as offset vector 96.

Video decoder 30 may decode residue from an encoded bitstream. As noted above, the residue represents the difference between current CU 90 and prediction block 92. According to aspects of this disclosure, the decoded residue may include predicted residual values, e.g., residual values that have been predicted using RDPCM. Accordingly, video decoder 30 may apply RDPCM to reconstruct the residue (e.g., the difference between current CU 90 and prediction block 92). Video decoder 30 may then locate prediction block 92 using offset vector 96 and combine the reconstructed residue with prediction block 92 to determine current CU 90.

The techniques may be applied in both lossless and lossy coding schemes. For example, according to aspects of this disclosure, RDPCM may be applied to residue that has been generated using intra-BC, regardless of whether the residue subsequently subjected to quantization, as described above.

Figure 5B:
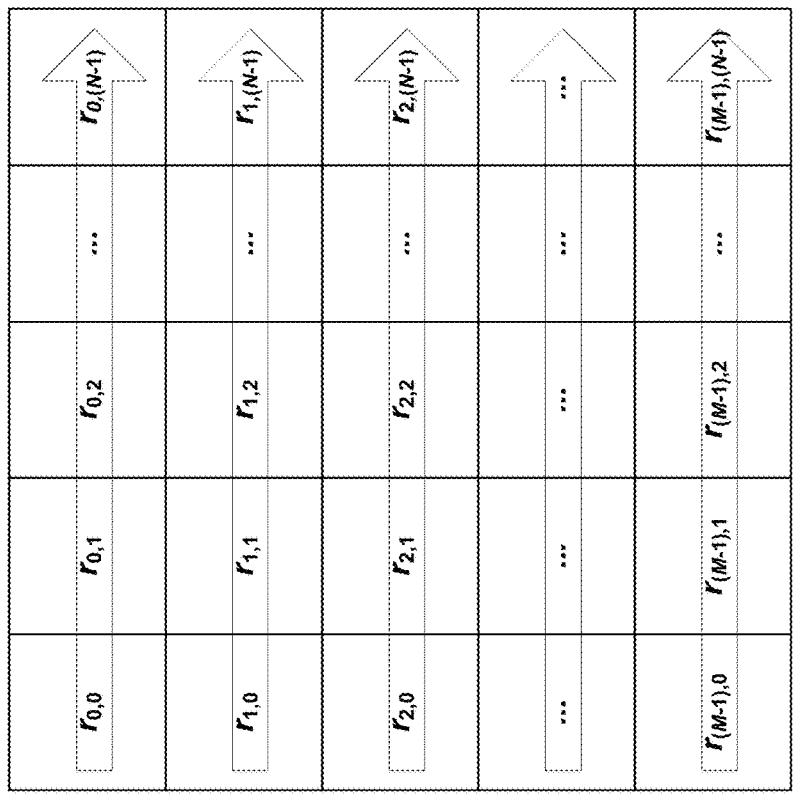
FIG. 5B shows a residual DPCM direction for near-horizontal modes.
Figure 5A:
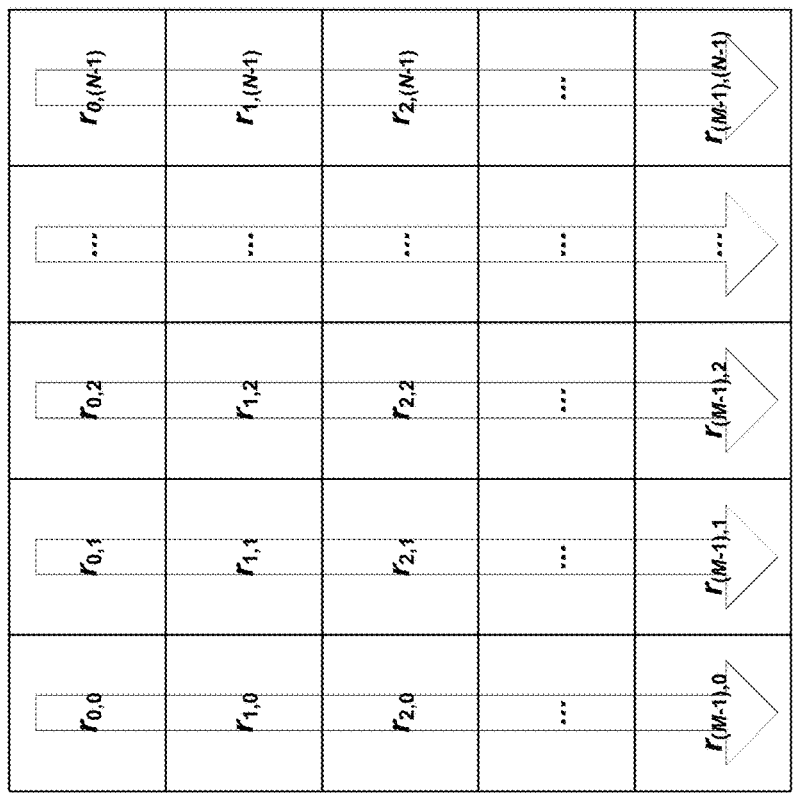
FIG. 5A shows a residual DPCM direction for near-vertical modes.

FIGS. 5A and 5B are diagrams illustrating examples of residue differential pulse code modulation (RDPCM) techniques. As noted above, two RDPCM modes include an RDPCM vertical mode and an RDPCM horizontal mode. The concept behind RDPCM is to use the upper row pixel to predict the current pixel for vertical mode and to use the left column pixel for predicting the current pixel for horizontal mode. For example, consider a residue block of size M (rows)×N (cols). Let $r_{i,j}$, $0 \le i \le (M-1)$, $0 \le j \le (N-1)$ be the residue (e.g., prediction residual after performing inter-intra- or intra-BC prediction). The residue block may represent any component of a video block (e.g. a luma component, a chroma component, a Red component, a Green component, a Blue component (in RGB coding) or the like).

In residual DPCM, prediction is applied to the residual samples, so that a modified M×N array $\tilde{R}$ with elements $\tilde{r}_{i,j}$ is obtained as follows for lossless vertical residual DPCM:

$$\tilde{r}_{i,j} = \begin{cases} r_{i,j}, & i = 0, 0 \le j \le (N-1) \\ r_{i,j} - r_{(i-1),j}, & 1 \le i \le (M-1), 0 \le j \le (N-1) \end{cases},$$

or for lossless horizontal RDPCM:

$$\tilde{r}_{i,j} = \begin{cases} r_{i,j}, & 0 \le i \le (M-1), j = 0 \\ r_{i,j} - r_{i,(j-1)}, & 0 \le i \le (M-1), 1 \le j \le (N-1) \end{cases}.$$

Video encoder 20 signals the modified residual samples of $\tilde{R}$ instead of the original residual samples R in an encoded bitstream. As described herein, the modified residual samples may be referred to as predicted residual samples, because the modified residual samples are essentially predicted from adjacent residual samples.

In other words, if the residual block included samples R, then video encoder 20 may determine the modified residual samples $\tilde{R}$, which represents the residual block with RDPCM applied. Video encoder 20 may apply the same RDPCM process regardless of whether quantization is performed (e.g., the lossy case) or quantization is skipped (e.g. the lossless case). In some examples, video encoder 20 may extend RDPCM to the lossy case only for those TUs where the transform is skipped. In particular, for lossy RDPCM-vertical:

$$\tilde{r}(i, j) = \begin{cases} Q(r(i, j)) & i = 0 \text{ and } 0 \le j \le N-1 \\ Q(r(i, j)) - \hat{r}(i-1, j)) & 0 < i \le M-1 \text{ and } 0 \le j \le N-1 \end{cases}$$

or for RDPCM-horizontal:

$$\tilde{r}(i, j) = \begin{cases} Q(r(i, j)) & j = 0 \text{ and } 0 \le i \le N-1 \\ Q(r(i, j)) - \hat{r}(i, j-1)) & 0 < i \le M-1 \text{ and } 0 \le j \le N-1 \end{cases}$$

where Q denotes the forward quantisation operation and $\hat{r}$ is a reconstructed version of residual values r.

At the decoder side, video decoder 30 may parse the modified (e.g., predicted) residual samples from an encoded bitstream. Video decoder 30 may then reconstruct the residual samples as follows for lossless RDPCM-vertical:

$$r_{i,j} = \sum_{k=0}^{i} \tilde{r}_{k,j}, 0 \le i \le (M-1), 0 \le j \le (N-1),$$

or for lossless RDPCM-horizontal:

$$r_{i,j} = \sum_{k=0}^{j} \tilde{r}_{i,k}, 0 \le i \le (M-1), 0 \le j \le (N-1).$$

Video decoder 30 may also apply RDPCM in lossy and lossless video coding. For example, video decoder 30 may add the reconstructed residuals after inverse quantisation according to the selected RDPCM mode to obtain the reconstructed residuals r̂(i, j) for lossy RDPCM-vertical:

$$\hat{r}(i, j) = \sum_{k=0}^{i} Q^{-1}(\tilde{r}(k, j))$$

or for lossy RDPCM-horizontal:

$$\hat{r}(i, j) = \sum_{k=0}^{j} Q^{-1}(\tilde{r}(i, k))$$

where $Q^{-1}$ denotes the inverse quantisation operation.

As noted above, for inter-RDPCM (e.g., applying RDPCM to motion compensated residue) video encoder 20 may explicitly signal whether to apply RDPCM to video decoder 30 in an encoded bitstream. Video encoder 20 may also explicitly signal one or more syntax elements in an encoded bitstream indicating the RDPCM mode (e.g., no RDPCM, vertical RDPCM, or horizontal RDPCM) for a particular block (or blocks) of video data. Video decoder 30 may receive the one or more syntax elements and perform the RDPCM in a reciprocal manner, as noted above.

According to aspects of this disclosure, video encoder 20 and/or video decoder may apply RDPCM to residue that has been generated using an intra-BC coding process. For example, as noted above, video encoder 20 may determine an offset vector that identifies a location of a prediction block that closely matches the block currently being coded. Video encoder 20 may determine a residue based on a difference between the current block and the prediction block.

Video encoder 20 may determine an RDPCM mode. In some examples, video encoder 20 may determined the RDPCM mode using a rate-distortion analysis (e.g., a rate-distortion optimization). Video encoder 20 may select between RDPCM off (e.g., not applying RDPCM) a vertical mode (as shown in the example of FIG. 5A) or a horizontal mode (e.g., as shown in the example of FIG. 5B). Video encoder 20 may use the determined mode to generate modified residual values, e.g., according to the process described above, which may also be referred to as predicted residual values. Video encoder 20 may then encode the predicted residual values, as well as the determined offset vector.

Video decoder 30 may decode residue from an encoded bitstream. The decoded residue may include modified residual values, e.g., residual values that have been predicted using RDPCM. Video decoder 30 may apply RDPCM to reconstruct the residue (e.g., a quantized version of the original residue). For example, video decoder 30 may apply a reciprocal RDPCM process as video encoder 20 to reconstruct an unmodified residue.

According to aspects of this disclosure, video decoder 30 may decode one or more syntax elements to determine the appropriate RDPCM mode to apply to the modified residue. For example, the one or more syntax elements may indicate whether to select RDPCM off (e.g., not applying RDPCM) a vertical mode (as shown in the example of FIG. 5A) or a horizontal mode (e.g., as shown in the example of FIG. 5B). As noted above, the one or more syntax elements may be provided at the CU, TU, or PU level.

After reconstructing the residue, video decoder 30 may locate the prediction block using an offset vector obtained from the encoded bitstream. Video decoder 30 may then reconstruct the block currently being decoded by combining the reconstructed residue (e.g., a quantized version of the original residue) with the prediction block. As noted above, the techniques may be applied in both lossless and lossy coding schemes. For example, according to aspects of this disclosure, RDPCM may be applied to residue that has been generated using intra-BC, regardless of whether the residue subsequently subjected to quantization.

According to aspects of this disclosure, RDPCM may be enabled (or disabled) at a sequence level, e.g., according to one or more syntax elements included in an SPS. For example, video encoder 20 may encode one or more syntax elements indicating whether RDPCM is enabled for intra-BC predicted data. In general, when enabled, video decoder 30 may expect to decode information indicating a particular RDPCM mode whenever video decoder 30 decodes a block that has been encoded with an intra-BC process.

In one example, a residual_dpcm_inter_enabled_flag syntax element may be used indicate whether RDPCM may be applied to a block that has been predicted using intra-BC. Flynn et al., "High Efficiency Video Coding (HEVC) Range Extensions text specification: Draft 4." JCTVC-N1005_v3, August 2013, by D. Flynn, J. Sole, and T. Suzuki may provide some description related to the residual_dpcm_inter_enabled_flag at the SPS level. In some examples, when the residual_dpcm_inter_enabled_flag syntax element is equal to one, RDPCM is available for use by video encoder 20 and video decoder 30 for blocks predicted using intra-BC. In such examples, when the residual_dpcm_inter_enabled_flag syntax element is equal to zero, RDPCM is not available for use by video encoder 20 and video decoder 30 for blocks predicted using intra-BC. It should be understood that the syntax element values described above are provided for purposes of illustration and should not be considered limiting. Also, these example syntax elements need not necessarily be part of the SPS.

In some examples, the one or more syntax elements that indicate whether RDPCM is enabled may be applicable to more than one prediction mode (e.g., where prediction modes include inter-prediction mode, intra-prediction mode, and intra-BC prediction mode). For example, video encoder 20 may encode a residual_dpcm_inter_enabled_flag syntax element (or a similar syntax element) to indicate whether RDPCM is enabled for both inter-predicted residual and intra-BC predicted residual (e.g., the flag is applicable to both modes such that one flag is signaled for inter-prediction mode and intra-BC prediction mode). Video decoder 30 may decode such a flag from the bitstream and determine whether RDPCM is enabled. When enabled, one or more additional syntax elements may be explicitly signaled to indicate whether RDPCM is on or off for a block (e.g., whether RDPCM is applied or not) and a direction of the RDPCM for the block (if applied).

The residual_dpcm_inter_enabled_flag syntax element described above is merely one example. In another example, instead of or in addition to the residual_dpcm_inter_enabled_flag syntax element, a residual_dpcm_intra_enabled_flag syntax element may be included at the SPS level to control whether the RDPCM is enabled for the blocks predicted with intra-BC. The JCTVC-N1005_v3 document may also provide description related to the residual_dpcm_intra_enabled_flag.

Figure 6:
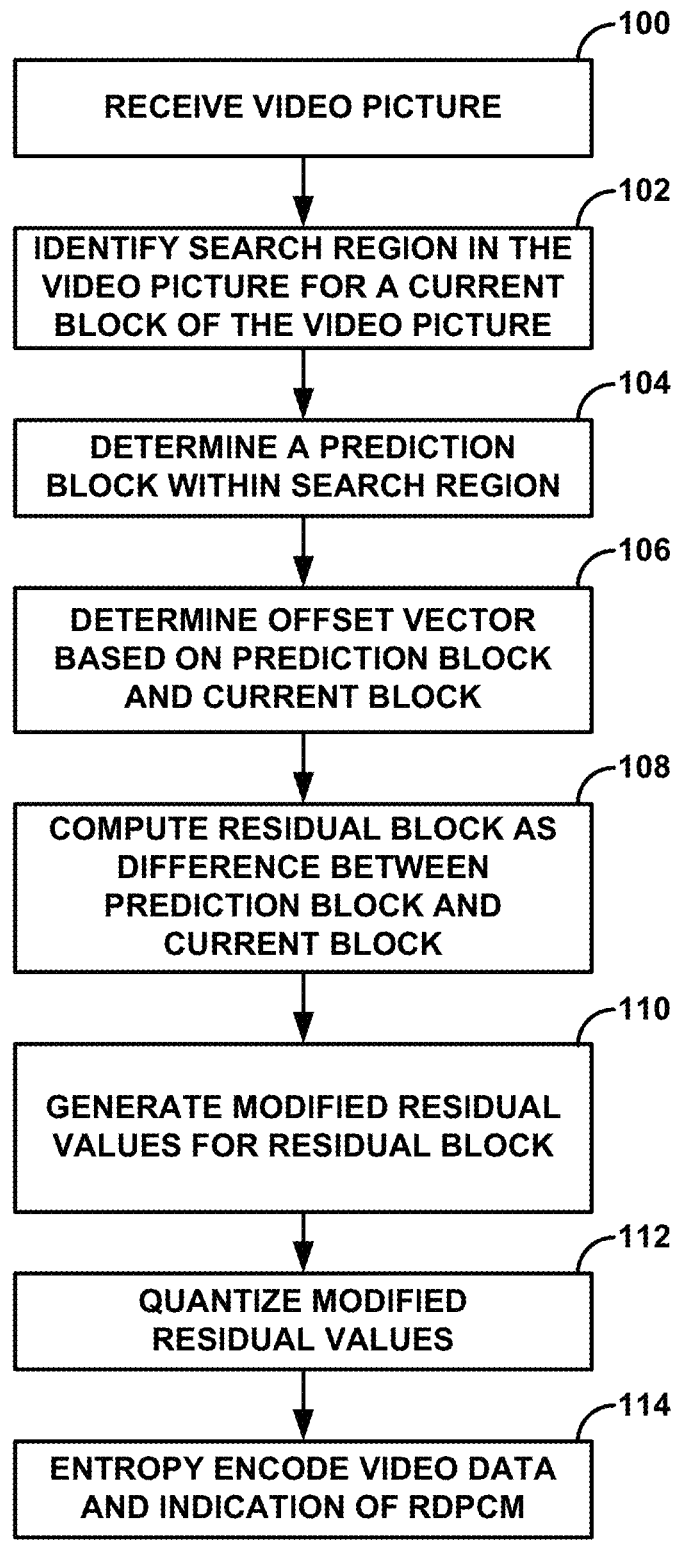
FIG. 6 is a flowchart illustrating an example technique of encoding video data in accordance with this disclosure.

FIG. 6 is a flowchart illustrating exemplary operation of a video encoding device, such as video encoder 20 shown in the example of FIG. 2, in performing the techniques described in this disclosure. While described with respect to video encoder 20, it should be understood that the techniques of FIG. 6 may be carried out by a variety of other devices having a variety of other processing capabilities.

In the example of FIG. 6, video encoder 20 receives a video picture or slice to be coded (100). In performing the intra-BC process, intra-BC unit 47 may first identify a search region in the video picture for a current block (e.g., CU) of the video picture (102). After identifying the appropriate search region, intra-BC unit 47 may next determine a prediction block within the search region from which the current block is to be predicted (104). Intra-BC unit 47 may perform this determination by accessing one or more blocks within the search region and determining the difference between each block and the current CU. Intra-BC unit 47 may determine the prediction block as the block that results in the least amount of residual or, in other words, smallest difference between the block and the current CU.

Intra-BC unit 47 may next determine an offset vector identifying the location of the selected block (which may be referred to as the "prediction block") relative to the current CU. In this way, intra-BC unit 47 may determine the offset vector based on the prediction block and the current block (106). Intra-BC unit 47 may pass the offset vector to entropy encoding unit 56, which entropy encodes the offset vector and adds the encoded offset vector to the bitstream. Intra-BC unit 47 also determines a residual as the difference between the prediction block and the current block (108) and passes the residual as a residual block to the transform processing unit 52.

According to aspects of this disclosure, video encoder 20 may generate modified residual values for the residual block (110). For example, video encoder 20 may predict one or more residual values of the residual block from one or more other residual values of the residual block. In some examples, video encoder 20 may generate the modified residual values by applying RDPCM to the residual block. As described above with respect to FIGS. 5A and 5B, video encoder may apply a vertical RDPCM mode or a horizontal RDPCM mode to generate the modified residual values.

Quantization unit 54 quantizes the modified residual values to further reduce bit rate (112). While the example process shown in FIG. 6 includes quantization, in other examples, as noted above, quantization may be skipped (e.g., in a lossless coding process). In such instances, video encoder 20 may pass the modified residual values directly to entropy encoding unit 56.

Following quantization (if performed), entropy encoding unit 56 entropy codes (which refers to statistical lossless coding, as one example) the quantized values (114) and includes the entropy encoded quantized values in the bitstream. This process iterates until all of the blocks of the video picture are encoded, although not all of the block may be encoded using an intra-BC process.

While certain techniques may be ascribed to certain units of video encoder 20, it should be understood that one or more other units of video encoder 20 may also be responsible for carrying out such techniques.

Figure 7:
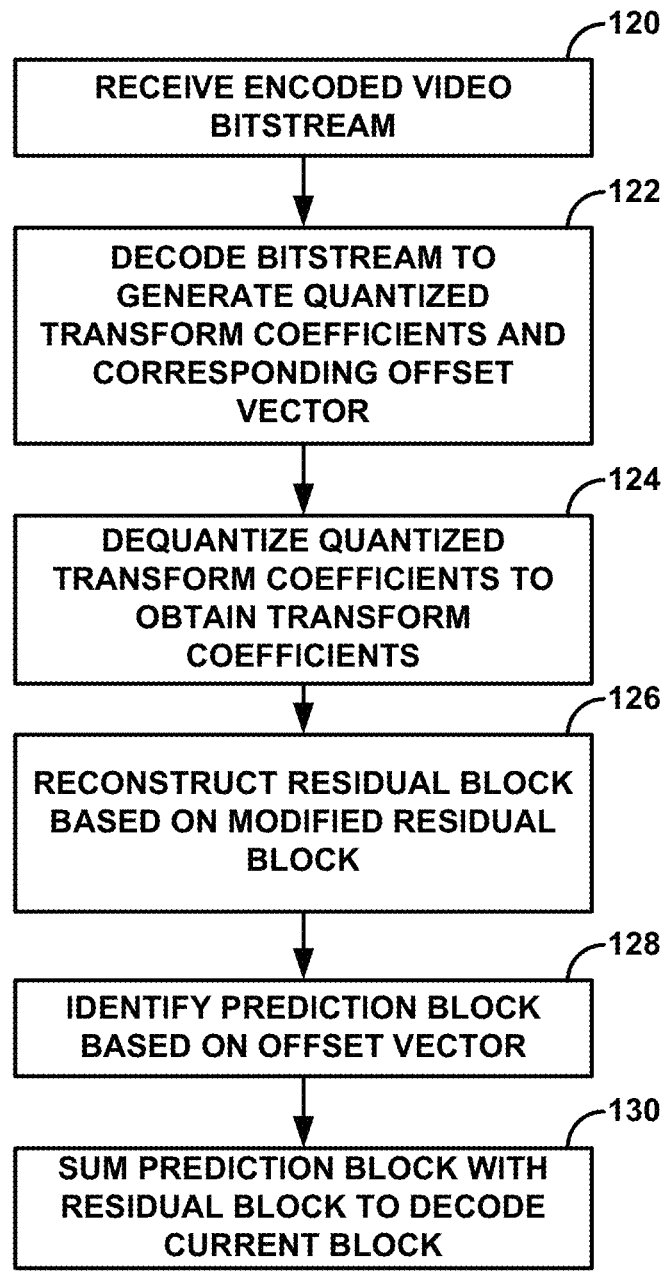
FIG. 7 is a flowchart illustrating an example technique of decoding video data in accordance with this disclosure.

FIG. 7 is a flowchart illustrating exemplary operation of a video decoding device, such as video decoder 30 shown in the example of FIG. 3, in performing the techniques described in this disclosure. Again, while described with respect to video decoder 30, it should be understood that the techniques of FIG. 7 may be carried out by a variety of other devices having a variety of other processing capabilities.

Initially, video decoder 30 receives an encoded video bitstream that represents video blocks of an encoded video slice and associated syntax elements from video encoder 20.

Entropy decoding unit 70 of video decoder 30 entropy decodes the bitstream to generate quantized coefficients, and in the case of intra-BC, a corresponding an offset vector (122). While the process shown in the example of FIG. 7 is described with respect to a lossy coding process (with quantization applied to residue), as noted above, the techniques may also be performed in lossless video coding.

In the case of lossy coding, entropy decoding unit 70 forwards the quantized coefficients to inverse quantization unit 76 and the corresponding offset vector to intra-BC unit 75. Inverse quantization unit 76 dequantizes the quantized coefficients to obtain a modified residual block (124) (in instances in which quantization is applied). The modified residual block may also be referred to as a predicted residual block, because, as described below, values of an unmodified residual block to which the modified residual block corresponds have been predicted using other values of the unmodified residual block.

According to aspects of this disclosure, video decoder 30 may reconstruct a residual block based on the values of the modified residual block (126). For example, video decoder 30 may apply a reciprocal process as video encoder 20 to reconstruct the residual values of the block from the received modified residual values of the block. In some examples, video decoder 30 may reconstruct the residual block by applying RDPCM to the modified residual block. As described above with respect to FIGS. 5A and 5B, video decoder 30 may apply a vertical RDPCM mode or a horizontal RDPCM mode to reconstruct the residual values of the residual block.

Intra-BC unit 75 identifies a prediction block stored to reference picture memory 82 (or some other intermediate memory) based on the offset vector (128) and provides this prediction block to summer 80. Summer 80 sums the residual block with the prediction block to decode (e.g., reconstruct) the coded current block (130).

While certain techniques may be ascribed to certain units of video decoder 30, it should be understood that one or more other units of video decoder 30 may also be responsible for carrying out such techniques.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Certain aspects of this disclosure have been described with respect to the developing HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
decoding a single syntax element, in a sequence parameter set (SPS) that is applicable to a plurality of pictures, which explicitly indicates whether a residual differential pulse code modulation (RDPCM) process is enabled for one or more blocks in the plurality of pictures of the SPS including whether the RDPCM process is enabled for at least a first block in one of the plurality pictures predicted in an intra-block copying prediction mode and whether the RDPCM process is enabled for at least a second block in one of the plurality of pictures predicted in an inter-prediction mode
based on the syntax element indicating that the RDPCM process is enabled, generating a residual block for the first block based on a predicted residual block including reconstructing one or more residual values of the residual block by applying the RDPCM process to one or more predicted residual values of the predicted residual block, wherein applying the RDPCM process comprises obtaining, from an encoded bitstream, data that indicates an RDPCM mode for the residual block from a plurality of RDPCM modes and applying the indicated RDPCM mode to the predicted residual block;
applying the intra-block copying prediction mode to predict the first block, wherein applying the intra-block copying prediction mode comprises locating a prediction block in a picture that includes the first block based on a displacement vector and a location of the first block in the picture that includes the first block; and
generating the first block based on a combination of the residual block and the prediction block.

2. The method of claim 1, further comprising obtaining the predicted residual block from the encoded bitstream.

3. The method of claim 1, wherein applying the indicated RDPCM mode to the predicted residual block comprises applying horizontal RDPCM to the one or more predicted residual values of the predicted residual block based on the RDPCM mode for the residual block indicating horizontal RDPCM.

4. The method of claim 1, wherein applying the indicated RDPCM mode to the predicted residual block comprises applying vertical RDPCM to the one or more predicted residual values of the predicted residual block based on the RDPCM mode for the residual block indicating vertical RDPCM.

5. The method of claim 1, wherein the plurality of RDPCM modes comprise an RDPCM off mode, an RDPCM vertical mode, and an RDPCM horizontal mode.

6. The method of claim 1, further comprising:
obtaining, from the encoded bitstream, the displacement vector for locating the prediction block in the picture.

7. The method of claim 1, wherein generating the residual block further comprises applying inverse quantization to the residual block in a lossy decoding process.

8. The method of claim 1, wherein generating the residual block comprises generating the residual block without performing inverse quantization in a lossless decoding process.

9. A method of encoding video data, the method comprising:
applying an intra-block copying prediction mode to predict a first block in a picture of a plurality of pictures, wherein applying the intra-block copying prediction mode comprises locating a prediction block in the picture of the plurality of pictures based on a displacement vector and a location of the first block of the picture;

generating a residual block for the first block of the picture based on a difference between the first block and the prediction block of the picture;

determining whether a residual differential pulse code modulation (RDPCM) process is enabled for the plurality of pictures including for at least the first block predicted in the intra-block copying prediction mode and at least a second block predicted in an inter-prediction mode;

based on the RDPCM process being enabled, generating a predicted residual block based on the residual block by applying the RDPCM process to predict one or more residual values of the residual block based on one or more other residual values of the residual block, wherein applying the RDPCM process comprises selecting an RDPCM mode from a plurality of RDPCM modes and applying the selected RDPCM mode;

encoding, in a bitstream, a single syntax element, in a sequence parameter set (SPS) that is applicable to the plurality of pictures, which explicitly indicates that RDPCM process is enabled for one or more blocks in the plurality of pictures of the SPS including that RDPCM process is enabled for at least the first block predicted in the intra-block copying prediction mode and that RDPCM process is enabled for at least the second block in one of the plurality of pictures predicted in the inter-prediction mode;

encoding, in the bitstream, data that indicates the RDPCM mode from the plurality of RDPCM modes; and encoding data that represents the predicted residual block in the bitstream.

10. The method of claim 9, wherein applying the selected RDPCM mode to the residual block comprises applying horizontal RDPCM to the one or more residual values based on the selected RDPCM mode being horizontal RDPCM.

11. The method of claim 9, wherein applying the selected RDPCM mode to the residual block comprises applying vertical RDPCM to the one or more residual values based on the selected RDPCM mode being vertical RDPCM.

12. The method of claim 9, wherein the plurality of RDPCM modes comprise an RDPCM off mode, an RDPCM vertical mode, and an RDPCM horizontal mode.

13. The method of claim 9, further comprising encoding data that represents the displacement vector.

14. The method of claim 9, wherein encoding the data comprises applying quantization to the predicted residual block in a lossy encoding process.

15. The method of claim 9, wherein encoding the data comprises encoding the data without applying quantization to the predicted residual in a lossless encoding process.

16. A device for of decoding video data, the device comprising:

a memory configured to store the video data; and a video decoder comprising processing circuitry, the video decoder is configured to:

decode a single syntax element, in a sequence parameter set (SPS) that is applicable to a plurality of pictures, which explicitly indicates whether a residual differential pulse code modulation (RDPCM) process is enabled for one or more blocks in the plurality of pictures of the SPS including whether the RDPCM process is enabled for at least a first block in one of the plurality of pictures predicted in an intra-block copying prediction mode and whether the RDPCM process is enabled for at least a second block in one of the plurality of pictures predicted in an inter-prediction mode based on the syntax element indicating that the RDPCM process is enabled, generate a residual block for the first block based on a predicted residual block stored in the memory, wherein to generate the residual block, the video decoder is configured to reconstruct one or more residual values of the residual block by applying the RDPCM process to one or more predicted residual values of the predicted residual block, wherein to apply the RDPCM process, the video decoder is configured to obtain, from an encoded bitstream, data that indicates an RDPCM mode for the residual block from a plurality of RDPCM modes and apply the indicated RDPCM mode to the predicted residual block;

apply the intra-block copying prediction mode to predict the first block, wherein to apply the intra-block copying prediction mode, the video decoder is configured to locate a prediction block in a picture that includes the first block based on a displacement vector and a location of the first block in the picture that includes the first block; and generate the first block based on a combination of the residual block and the prediction block.

17. The device of claim 16, wherein the video decoder is further configured to obtain the predicted residual block from the encoded bitstream.

18. The device of claim 16, wherein to apply the indicated RDPCM mode to the predicted residual block, the video decoder is configured to apply horizontal RDPCM to the one or more predicted residual values of the predicted residual block based on the RDPCM mode for the residual block indicating horizontal RDPCM.

19. The device of claim 16, wherein to apply the indicated RDPCM mode to the predicted residual block, the video decoder is configured to apply vertical RDPCM to the one or more predicted residual values of the predicted residual block based on the RDPCM mode for the residual block indicating horizontal RDPCM.

20. The device of claim 16, wherein the plurality of RDPCM modes comprise an RDPCM off mode, an RDPCM vertical mode, and an RDPCM horizontal mode.

21. The device of claim 16, wherein the video decoder is further configured to:

obtain, from the encoded bitstream, the displacement vector that indicates a location of the prediction block in the picture.

22. The device of claim 16, wherein to generate the residual block, the video decoder is configured to apply inverse quantization to the residual block in a lossy decoding process.

23. The device of claim 16, wherein to generate the residual block, the video decoder is configured to generate the residual block without performing inverse quantization in a lossless decoding process.

24. The device of claim 16, further comprising a display configured to display the first block of the picture.

25. A device for encoding video data, the device comprising:

a memory configured to store the video data;

a video encoder comprising processing circuitry, the video encoder is configured to:

apply an intra-block copying prediction mode to predict a first block in a picture of a plurality of pictures, wherein to apply the intra-block copying prediction mode, the video encoder is configured to locate a prediction block in the picture of the plurality of pictures based on a displacement vector and a location of the first block of the picture;

generate a residual block for the first block of the picture based on a difference between the first block and the prediction block of the picture;

determine whether a residual differential pulse code modulation (RDPCM) process is enabled for the plurality of pictures including for at least the first block predicted in the intra-block copying prediction mode and at least a second block predicted in an inter-prediction mode;

based on the RDPCM process being enabled, generate a predicted residual block based on the residual block by applying the RDPCM process to predict one or more residual values of the residual block based on one or more other residual values of the residual block, wherein to apply the RDPCM process, the video encoder is configured to select an RDPCM mode from a plurality of RDPCM modes and apply the selected RDPCM mode;

encode, in a bitstream, a single syntax element, in a sequence parameter set (SPS) that is applicable to the plurality of pictures, which explicitly indicates that the RDPCM process is enabled for one or more blocks in the plurality of pictures of the SPS includes that RDPCM process is enabled for at least the first block predicted in the intra-block copying prediction mode and that RDPCM process is enabled for at least the second block in one of the plurality of pictures in the inter-prediction mode encode, in the bitstream, data that indicates the RDPCM mode from the plurality of RDPCM modes; and encode data that represents the predicted residual block in the bitstream.

26. The device of claim 25, wherein to apply the selected RDPCM mode to the residual block, the video encoder is configured to apply horizontal RDPCM to the one or more residual values based on the selected RDPCM mode being horizontal RDPCM.

27. The device of claim 25, wherein to apply the selected RDPCM mode to the residual block, the video encoder is configured to apply vertical RDPCM to the one or more residual values based on the selected RDPCM mode being vertical RDPCM.

28. The device of claim 25, wherein the plurality of RDPCM modes comprise an RDPCM off mode, an RDPCM vertical mode, and an RDPCM horizontal mode.

29. The device of claim 25, wherein the video encoder is further configured to encode data that represents the displacement vector.

30. The device of claim 25, wherein to encode the data, the video encoder is configured to apply quantization to the predicted residual block in a lossy encoding process.

31. The device of claim 25, wherein to encode the data, the video encoder is configured to encode the data without applying quantization to the predicted residual in a lossless encoding process.

32. The device of claim 25, further comprising a video camera configured to capture the picture that includes the first block.

33. A device for decoding video data, the device comprising:
means for decoding a single syntax element, in a sequence parameter set (SPS) that is applicable to a plurality of pictures, which explicitly indicates whether a residual differential pulse code modulation (RDPCM) process is enabled for one or more blocks in the plurality of pictures of the SPS including whether the RDPCM process is enabled for at least a first block in one of the plurality of pictures predicted in an intra-block copying prediction mode and whether the RDPCM process is enabled for at least a second block in one of the plurality of pictures predicted in an inter-prediction mode means for generating a residual block for the first block based on a predicted residual block, based on the syntax element indicating that the RDPCM process is enabled, including reconstructing one or more residual values of the residual block by applying the RDPCM process to one or more predicted residual values of the predicted residual block, wherein the means for applying the RDPCM process comprises means for obtaining, from an encoded bitstream, data that indicates an RDPCM mode for the residual block from a plurality of RDPCM modes and means for applying the indicated RDPCM mode to the predicted residual block;

means for applying the intra-block copying prediction mode to predict the first block, wherein the means for applying the intra-block copying prediction mode comprises means for locating a prediction block in a picture that includes the first block based on a displacement vector and a location of the first block in the picture that includes the first block; and means for generating the first block based on a combination of the residual block and the prediction block.

34. A device for encoding video data, the device comprising:
means for applying an intra-block copying prediction mode to predict a first block in a picture of a plurality of pictures, wherein the means for applying the intra-block copying prediction mode comprises means for locating a prediction block in the picture of the plurality of pictures based on a displacement vector and a location of the first block of the picture;

means for generating a residual block for the first block of the picture based on a difference between the first block and the prediction block of the picture;

means for determining whether a residual differential pulse code modulation (RDPCM) process is enabled for the plurality of pictures including for at least the first block predicted in the intra-block copying prediction mode and at least a second block predicted in an inter-prediction mode;

means for generating, based on the RDPCM process being enabled, a predicted residual block based on the residual block by applying the RDPCM process to predict one or more residual values of the residual block based on one or more other residual values of the residual block, wherein means for applying the RDPCM process comprises means for selecting an RDPCM mode from a plurality of RDPCM modes and means for applying the selected RDPCM mode;

means for encoding, in a bitstream, a single syntax element, in a sequence parameter set (SPS) that is applicable to the plurality of pictures, which explicitly indicates that RDPCM process is enabled for one or more blocks in the plurality of pictures of the SPS including that RDPCM process is enabled for at least the first block predicted in the intra-block copying prediction mode and that RDPCM process is enabled for at least the second block in one of the plurality of pictures predicted in the inter-prediction mode means for encoding, in the bitstream, data that indicates the RDPCM mode from the plurality of RDPCM modes; and means for encoding data that represents the predicted residual block in the bitstream.

35. A non-transitory computer-readable medium having instructions stored thereon that, when executed, cause one or more processors to:

decode a single syntax element, in a sequence parameter set (SPS) that is applicable to a plurality of pictures, which explicitly indicates whether a residual differential pulse code modulation (RDPCM) process is enabled for one or more blocks in the plurality of pictures of the SPS including whether the RDPCM process is enabled for at least a first block in one of the plurality pictures predicted in an intra-block copying prediction mode and whether the RDPCM process is enabled for at least a second block in one of the plurality of pictures predicted in an inter-prediction mode based on the syntax element indicating that the RDPCM process is enabled, generate a residual block for the first block based on a predicted residual block including reconstructing one or more residual values of the residual block by applying the RDPCM process to one or more predicted residual values of the predicted residual block, wherein the instructions that cause the one or more processors to apply the RDPCM process comprise instructions that cause the one or more processors to obtain, from an encoded bitstream, data that indicates an RDPCM mode for the residual block from a plurality of RDPCM modes and apply the indicated RDPCM mode to the predicted residual block;

apply the intra-block copying prediction mode to predict the first block, wherein the instructions that cause the one or more processors to apply the intra-block copying prediction mode comprise instructions that cause the one or more processors to locate a prediction block in a picture that includes the first block based on a displacement vector and a location of the first block in the picture that includes the first block; and generate the first block based on a combination of the residual block and the prediction block.

36. A non-transitory computer-readable medium having instructions stored thereon that, when executed, cause one or more processors to:

apply an intra-block copying prediction mode to predict a first block in a picture of a plurality of pictures, wherein the instructions that cause the one or more processors to apply the intra-block copying prediction mode comprise instructions that cause the one or more processors to locate a prediction block in the picture of the plurality of pictures based on a displacement vector and a location of the first block of the picture;

generate a residual block for the first block of the picture based on a difference between the first block and the prediction block of the picture;

determine whether a residual differential pulse code modulation (RDPCM) process is enabled for the plurality of pictures including for at least the first block predicted in the intra-block copying prediction mode and at least a second block predicted in an inter-prediction mode;

based on the RDPCM process being enabled, generate a predicted residual block based on the residual block by applying the RDPCM process to predict one or more residual values of the residual block based on one or more other residual values of the residual block, wherein the instructions that cause the one or more processors to apply the RDPCM process comprise instructions that cause the one or more processors to select an RDPCM mode from a plurality of RDPCM modes and apply the selected RDPCM mode;

encode, in a bitstream, a single syntax element, in a sequence parameter set (SPS) for that is applicable to the plurality of pictures, which explicitly indicates that RDPCM process is enabled for one or more blocks in the plurality of pictures of the SPS including that RDPCM process is enabled for at least the first block predicted in the intra-block copying prediction mode and that RDPCM process is enabled for at least the second block in one of the plurality of pictures predicted in the inter-prediction mode encode, in the bitstream, data that indicates the RDPCM mode from the plurality of RDPCM modes; and encode data that represents the predicted residual block in the bitstream.

* * * * *